United States Patent
Bernhard et al.

(10) Patent No.: US 7,239,875 B2
(45) Date of Patent: Jul. 3, 2007

(54) ESTABLISHING OR RELEASING A RADIO CONNECTION BETWEEN A MOBILE AND A CELL FOR WIRELESS TELECOMMUNICATIONS

(75) Inventors: Urs Peter Bernhard, Nuremberg (DE); Mohammad Ather Khan, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 417 days.

(21) Appl. No.: 10/886,181

(22) Filed: Jul. 7, 2004

(65) Prior Publication Data

US 2006/0009158 A1    Jan. 12, 2006

(51) Int. Cl.
*H04Q 7/20* (2006.01)
(52) U.S. Cl. .................. 455/443; 455/436; 370/331
(58) Field of Classification Search ............ None
See application file for complete search history.

(56) References Cited

U.S. PATENT DOCUMENTS

| | | | |
|---|---|---|---|
| 5,422,933 A | 6/1995 | Barnett et al. ............. 379/60 |
| 7,020,184 B2 * | 3/2006 | Yuen ......................... 375/152 |
| 2002/0111158 A1 * | 8/2002 | Tee ............................ 455/421 |
| 2003/0002460 A1 * | 1/2003 | English ....................... 370/331 |
| 2003/0078046 A1 * | 4/2003 | Seo ............................ 455/436 |
| 2004/0043769 A1 | 3/2004 | Amerga et al. ............. 455/437 |

FOREIGN PATENT DOCUMENTS

EP       1 283 651        2/2003

OTHER PUBLICATIONS

M. Ylianttila, et al, "Supporting Resource Allocation with Vertical Handoffs in Multiple Radio Network Environment," *The 13th IEEE International Symposium*, Piscataway, NJ, (Sep. 15, 2002), pp. 64-68.
European Search Report, Appl. No. 05254040.8—2412 PCT/ (Oct. 13, 2005).

* cited by examiner

*Primary Examiner*—Erika A. Gary

(57) ABSTRACT

A method is provided of establishing or releasing a radio connection between a first mobile user station and a first cell for wireless telecommunications during a call with the first mobile user station. This is both whilst the call continues and dependent upon at least one predetermined criterion being met. This occurs in a network for wireless telecommunications handling calls with various data rates to mobile user stations such that some of the mobile user stations at a time have multiple radio connections to the network via multiple cells. A pilot signal is sent between the first cell and the first mobile user station. Received signal quality of the pilot signal between the first cell and the first mobile user station is detected. At least one predetermined criterion is selected dependent upon data rate of the call, and if it is determining that said signal quality of the pilot signal meets said at least one predetermined criterion, said radio connection is released or established.

12 Claims, 4 Drawing Sheets

ADDING A CELL

DELETING A CELL

REPLACING A CELL

US 7,239,875 B2

ESTABLISHING OR RELEASING A RADIO CONNECTION BETWEEN A MOBILE AND A CELL FOR WIRELESS TELECOMMUNICATIONS

FIELD OF THE INVENTION

The present invention relates to telecommunications, in particular wireless telecommunications.

DESCRIPTION OF THE RELATED ART

In wireless telecommunications networks of code division multiple access (CDMA) type, handover is commonplace. Handover is also known as handoff. By handover is here meant soft/softer handover, which is where a mobile user station is in radio connection with the network via a number of different cells at the same time.

Dependent on the changing signal propagation characteristics between a mobile user station and a cell, it can become appropriate to set up a radio connection between the mobile user station and that cell, or it can be appropriate to release the radio connection, if such connection exists. Accordingly such handover operations occur in consequence of predetermined signal quality criteria for handover being met. These criteria are the same for all mobile user stations within the cells of base stations that are under the control of a base station controller. Each cell or group of cells under the control of a base station or base station controller uses a single set of handover criteria independent of data rate of calls. These criteria are transmitted to mobile user stations in system information broadcasts (SIBs) and stored in memory by each mobile user station for subsequent use.

SUMMARY OF THE INVENTION

The inventors realised that handover criteria to be used can be advantageously selected dependent upon the desired data rate of the service to be provided. In other words, the handover criteria to be used for one data rate are different from those used for another. This can improve the overall operation of the network in satisfying demands for different types of services.

An example of the present invention is a method of establishing or releasing a radio connection between a first mobile user station and a first cell for wireless telecommunications during a call with the first mobile user station. This is both whilst the call continues and dependent upon at least one predetermined criterion being met. This occurs in a network for wireless telecommunications handling calls with various data rates to mobile user stations such that some of the mobile user stations at a time have multiple radio connections to the network via multiple cells. The method comprises various steps. A pilot signal is sent between the first cell and the first mobile user station. Received signal quality of the pilot signal between the first cell and the first mobile user station is detected. At least one predetermined criterion is selected dependent upon data rate of the call, and if it is determined that said signal quality of the pilot signal meets said at least one predetermined criterion, said radio connection is released or established.

BRIEF DESCRIPTION OF THE DRAWINGS

An illustrative embodiment of the present invention will now be described by way of example and with reference to the drawings, in which.

DETAILED DESCRIPTION

Figure 1:
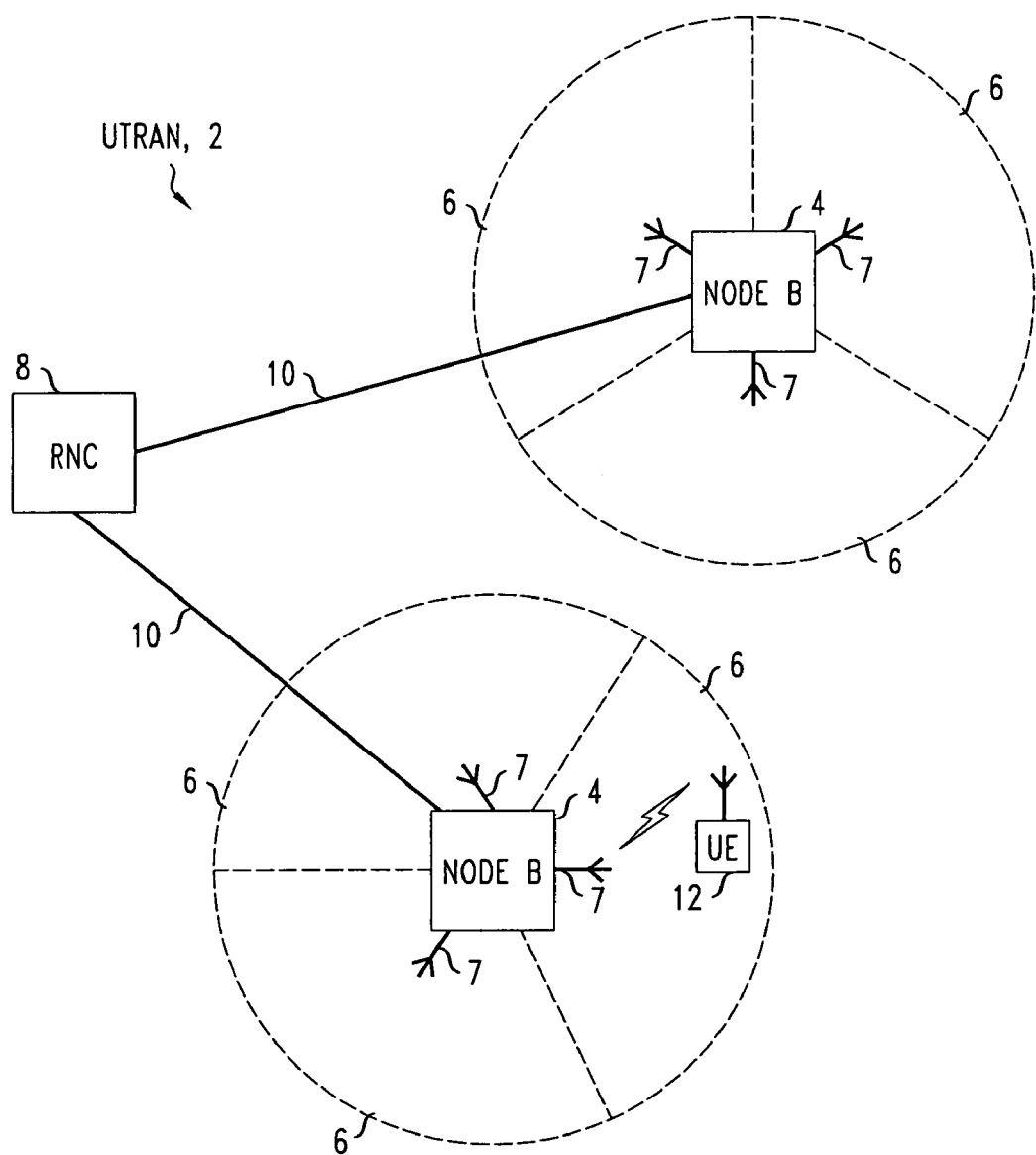
FIG. 1 is a diagram illustrating a Universal Mobile Telecommunications System (UMTS)

When considering a known Universal Mobile Telecommunications System (UMTS) system, the inventors realised that such a system is capable of supporting various data rates for different services, from adaptive multi-rate voice (AMR) having a data rate of approximately 5 to 12 kilobits per second (kbps) up to 384 kbps and beyond.

The likelihood of a mobile station within a cell being able to use a service can be adversely affected by interference experienced by the mobile station. Interference arises both due to existing users in the cell and due to communications in neighbouring cells. As interference increases, the transmit power from the base station of the cell to the mobile station must be increased. However, transmit power is limited to a maximum total transmit power. In consequence of this maximum total transmit power, there may be areas in the cell which are not covered by the service; for example, areas in the electrical shadow of buildings where direct 'line of sight' from the base station is blocked, and areas which experience multipath fading.

Although there may be such areas where there is no coverage within the cell, the probability over the whole cell of the service being available provides a useful measure of whether the service will be available to a mobile station within the cell. The probability over the whole cell of the service being available is known as coverage reliability.

Cell capacity for a service is the number of users within the cell who can have the service at any one time assuming a certain probability over the cell of the service being available. The cell capacity depends on transmit powers to the mobile stations from the base station. If transmit powers are high, so as to reach more areas of the cell that are subject to being in electrical shadow or multipath fading, fewer users can be supported as the maximum total transmit power of the base station is limited. Accordingly, it will be understood that there can be a trade-off between cell capacity and coverage reliability. Specifically, cell capacity increases as coverage reliability is reduced.

Despite transmit power being a limited resource, transmit power for a call is adjusted dependent on the desired data rate for that call. (This is additional to power variations dependent on how close the mobile user station is to the base station). A call in respect of a higher date rate service is transmitted at relatively higher power than a call in respect of a lower data rate service. This is so as to reduce the probability of bits being received in error.

Soft/softer handover is basically where new radio connections to cells are established before older connections are abandoned. A mobile user station can thus be connected to multiple cells for quite a while. The inventors realised that a mobile user terminal is relatively more likely to be in soft/softer handover connection when located near the edges of cells, and that it is then that transmit power to the mobile user station will be higher than normal so as to ensure good reception. Accordingly, the inventors realised that transmit power from a base station to a mobile user station that is in soft/softer handover and also using high data rate services can be particularly high. Of course, multiple base stations would then be transmitting to the mobile user station, each with a high transmit power.

The inventor realised that for high data rate calls, such as for a good quality video streaming service, coverage reliability is usually not important. This is because often such calls are made only within a small area. However, it is important that there is a sufficient cell capacity so that most, if not all, mobiles desiring that service can be provided with that service. On the other hand, for lower data rate services, such as Voice over Internet Protocol VoIP, good coverage reliability of the service is relatively more important, and cell capacity relatively less important, than for high data rate services.

The inventors realised that handover criteria affect both likelihood of coverage and the maximum number of mobile user stations which can be connected to at a time. In other words, handover criteria affect both coverage reliability and cell capacity. For example, less restrictive handover criteria result in more mobile user stations having multiple handover connections at a time. This leads to better coverage reliability by the service but less cell capacity, as more of the resources that are available are used in having more multiple connections to mobile user stations.

On the other hand, more restrictive handover criteria result in fewer mobile user stations being in handover connections at a time. This leads to lower reliability of service coverage but more capacity available to enable a relatively larger number of users to get the service. This is due to the fewer multiple connections made to mobile user stations.

Accordingly, the inventors realised that less restrictive handover criteria are more suitable for lower rate services; and conversely, more restrictive criteria are more suitable for higher rate services. Accordingly, the inventors realised that handover criteria should be selected dependent upon the desired data rate for the service to be provided. An example network in which this occurs will now be described.

The Network

The network is a Universal Mobile Telecommunications System (UMTS) terrestrial access network (UTRAN), which is a type of wideband code division multiple access (WCDMA) network for mobile telecommunications. The UTRAN network is basically as shown in FIG. 1. Only one radio network controller and two base stations of the UTRAN network 2 are shown for simplicity. A radio network controller is UMTS terminology for a base station controller. As shown in this Figure, the UTRAN network 2 includes base stations 4. In the Figure, each of the base stations 4 is also designated "Node B" in accordance with UMTS terminology. A cell, also referred to as a sector, is the radio-coverage area served by a corresponding antenna of a base station. Each base station typically has three cells 6, each covered by one of three directional antennas 7 angled at 120 degrees to each other in azimuth. Each radio network controller (RNC) 8 typically controls several base stations 4 and hence a number of cells 6. A base station 4 is connected to its controlling radio network controller (RNC) 8 via a respective interface 10 known as an IuB interface. In use, a mobile user station 12 (often referred to as User Equipment (UE) in UMTS terminology) communicates with a serving radio network controller (RNC) 8 via at least one cell 6 of at least one base station 4. In that way, the mobile user station communicates with the UTRAN network 2.

Handover

In wireless telecommunications networks of code division multiple access (CDMA) type, such as a Universal Mobile Telecommunications System (UMTS) network, for example as described above, soft handover and softer handover are commonplace. Handover is also known as handoff. Soft/softer handover is where a mobile user station is in radio connection with the network via a number of different cells at the same time. Soft handover specifically refers to the case where a mobile user station is connected to multiple base stations at a time. On the other hand, softer handover specifically refers to where connection is to multiple sectors of a base station at a time. Of course, the general situation where both or either occur is known as soft/softer handover, (often referred to simply as handover hereinafter in this text). The aim of such handover is to maintain a call despite radio fading.

The cells currently connected to by radio connection with the mobile user station are known as the active set. The mobile user station communicates using these cells. The mobile user station is also instructed by the network to also monitor signal quality to/from some neighbouring cells, which are not in the active set. This is in order to determine whether establishing a radio connection to any of these neighbouring cells would be helpful in maintaining the quality of the call. Signal quality is evaluated, for example, as signal strength.

In the example network, a handover is triggered by the mobile user station sending a message to the network that the signal quality criteria for a handover has been met, to which the network responds. This is termed Mobile Evaluated Handover (MEHO).

Figure 2:
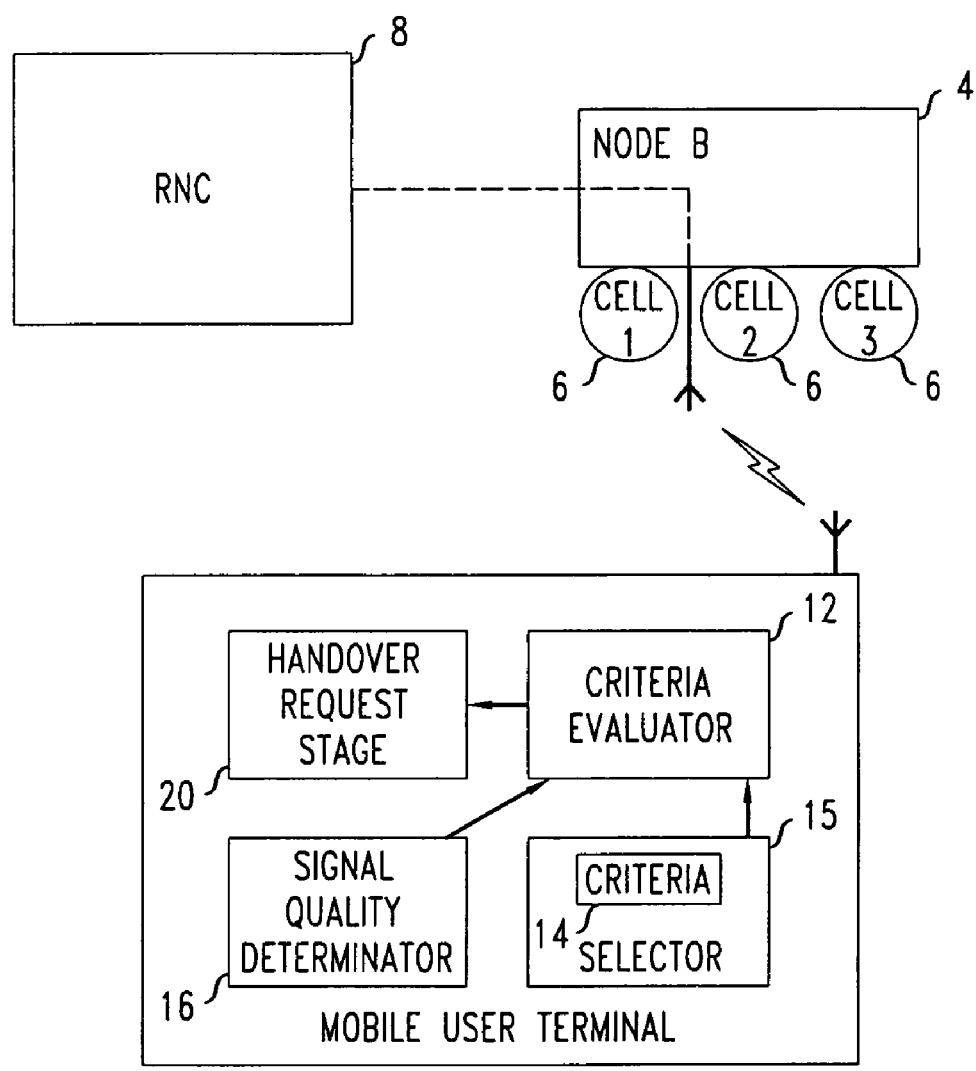
FIG. 2 is a diagram illustrating a base station controller, a base station and a mobile user station.

As shown in FIG. 2, MEHO operation involves a mobile user station 12 having a memory 14 which stores the various criteria for handover operations of adding a new cell, deleting a cell, or replacing one cell with another in the active set. The memory 14 is accessed by a criteria selector 15 which selects the criteria from knowledge of the type of call occurring and hence the data rate associated with that call. The mobile user station includes a signal quality determinator 16 connected to a criterion evaluator 18. If signal quality changes to such as to trigger a handover, a handover request stage 20 of the mobile user station sends a request for the appropriate handover operation. The request includes information as to which cell(s) is/are to be involved.

As shown in the FIG. 2, the request is passed by the base station 4 to the controlling radio network controller (RNC) 8 of the call with the mobile user station 12, known as the serving radio network controller (SRNC).

When to Handover

Dependent on change in signal quality with a cell, it can become appropriate to (a) add a cell into the active set by setting up a connection between the mobile user station and that cell, or (b) delete, in other words release, a cell from the active set by tearing down the connection between the mobile and the cell, or (c) replace one cell in the active set with another. These are considered in turn below.

For each case, handover depends on appropriate handover criteria being met, in particular offsets, as explained below. These criteria have direct impact on the system performance and therefore need to be optimised in order to achieve the desired performance. Performance is evaluated by measurements of parameters such as call blocking probability, call dropping probability, soft handover overhead, mean base station transmit power rise, mean noise rise at the base station, and mean number of handovers per mobile user station per call. Soft handover overhead is the mean number of handover links per mobile user station. These performance parameters are evaluated by each radio network controller (RNC) for the calls between mobile user stations and the base stations that the RNC controls.

Adjusting the Active Set for a Mobile User Station

Figure 3:
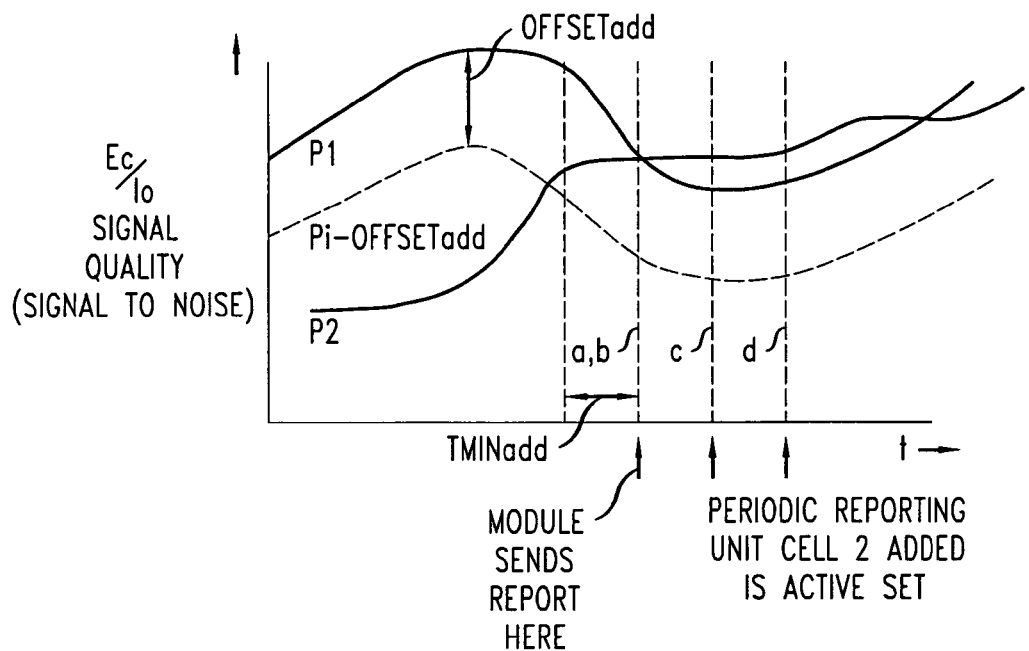
FIG. 3 is a diagram illustrating adding a cell into the set of cells having a call connection with a mobile user station.
Figure 4:
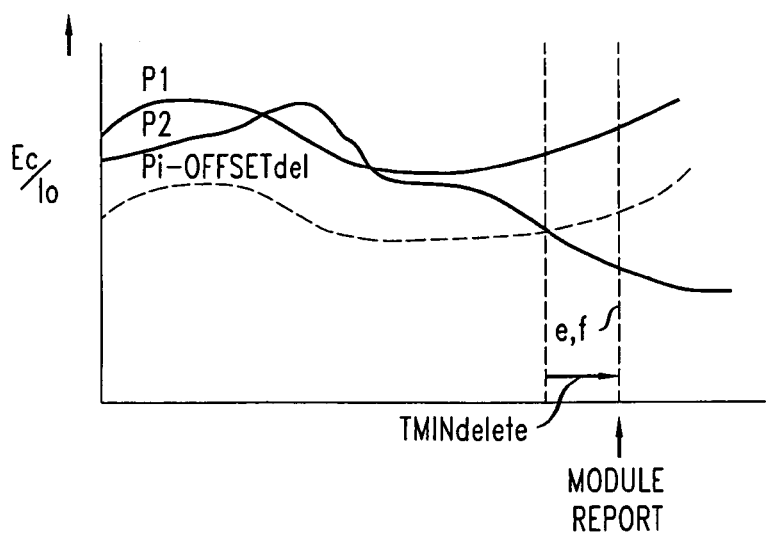
FIG. 4 is a diagram illustrating removing a cell from the set having a call connection with a mobile user station.
Figure 5:
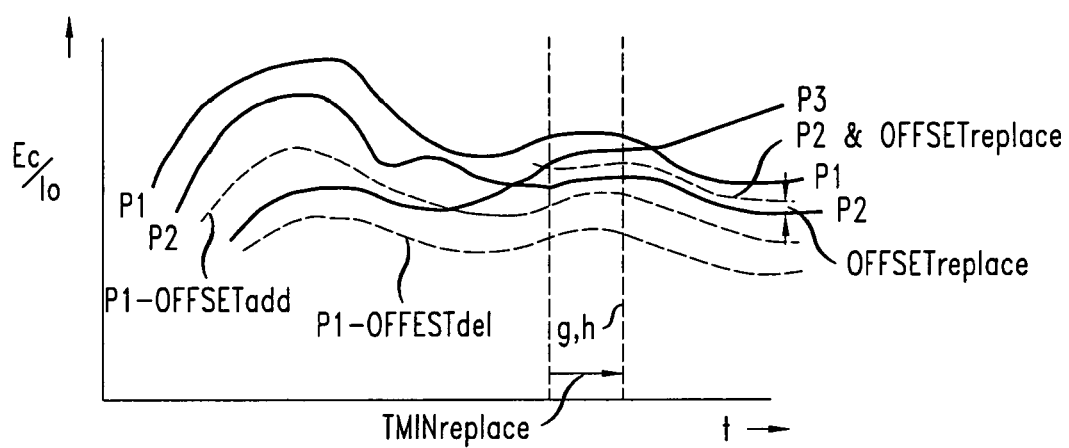
FIG. 5 is a diagram illustrating replacing a cell having a call connection with a mobile user station.

Each pilot signal sent from cells in the active set is received by a mobile user station which measures the signal to noise ratio ($E_c/I_o$) for that pilot signal and hence that cell. This is done for each pilot signal received, and so signal to noise ratios for every cell in the active set are monitored as they vary over time. At any time, the current best signal to noise ratio among the cells currently in the active set is taken as a reference signal to noise ratio P1. It is this series of reference signal to noise ratios over time which is shown in FIGS. 3, 4 and 5 as curve P1. Pilot signals are those sent on a pilot channel.

(a) Adding a Cell into the Active Set

For each data rate which might be desired, a respective signal to noise offset, denoted $OFFSET_{add}$, is defined. Also, for each data rate, a predetermined minimum time interval, denoted $TMIN_{add}$ is also defined.

As well as receiving pilot signals from cells in the active set, such as cell 1, pilot signals are received from neighbouring cells. Referring to FIG. 3, cell 2 is a neighbouring cell to cell 1 and sends pilot signals received by the mobile user station. If the signal to noise ratio ($E_c/I_o$) P2 of pilot signals from cell 2 goes above current P1 level minus $OFFSET_{add}$ (step a) for more than a predetermined minimum time interval, denoted $TMIN_{add}$, then the mobile user station sends (step b) a report indicating cell 2 is evaluated as being suitable for addition into the active set. This report is sent periodically repeatedly (e.g. FIG. 3: steps c and d) until either cell 2 is added into the active set and the mobile user station is informed accordingly, or the condition P2 is greater than P1 minus $OFFSET_{add}$ no longer applies, whichever happens first.

It will be appreciated, in view of the above, that the $OFFSET_{add}$ parameter is of importance in deciding whether to add a cell into the active set. The smaller the value of this $OFFSET_{add}$ parameter, the less likely it is for a cell to be added into the active set. Also, the larger the value set for $TMIN_{add}$, the less likely it is that a new cell will be added.

In some cases, $TMIN_{add}$ is set to zero meaning that every time the signal to noise ratio ($E_c/I_o$) P2 of pilot signals from cell 2 goes above current P1 (step a) then the mobile user station starts sending report (step b and so on) indicating cell 2 is evaluated as being suitable for addition into the active set.

Another parameter which is not relevant until it is reached is the maximum active set size. There is a limit on how many connections a mobile user station can have to different cells at a time. Once that limit is reached, cells can only be deleted from or replaced in the active set, as described below, until the number of connections is no longer at the maximum.

(b) Deleting a Cell from the Active Set

For each data rate which might be desired, a respective signal to noise offset, denoted $OFFSET_{del}$, is defined. Also, for each data rate, a predetermined minimum time interval, denoted $TMIN_{del}$ is also defined.

As well as receiving pilot signals from cells in the active set, such as cell 1, pilot signals are received from neighbouring cells. Referring to FIG. 4, cell 2 is a neighbouring cell to cell 1. Both cell 1 and cell 2 are in the active set and send pilot signals received by the mobile user station. However if the signal to noise ratio ($E_c/I_o$) P2 of pilot signal from cell 2 goes below current P1 level minus $OFFSET_{del}$ (step e) for more than a predetermined minimum time interval, denoted $TMIN_{del}$, then the mobile user station sends (step f) a report indicating cell 2 is evaluated as being unsuitable to remain in the active set Cell 2. The RNC then responds by deleting Cell 2 from the active set of the mobile user station. It will be appreciated, in view of the above, that the $OFFSET_{del}$ parameter is of importance in deciding whether to delete a cell from the active set. The smaller the value of this $OFFSET_{del}$ parameter, the more likely it is for a cell to be deleted from the active set. Also, the smaller the value set for $TMIN_{del}$, the more likely it is that a cell will be deleted.

(c) Replacing a Cell in the Active Set

For each data rate which might be desired, a respective signal to noise offset, denoted $OFFSET_{rep}$, is defined. Also, for each data rate, a predetermined minimum time interval, denoted $TMIN_{rep}$ is also defined.

As well as receiving pilot signals from cells in the active set, pilot signals are received from neighbouring cells. Referring to FIG. 5, cell 3 is a neighbouring cell to cell 1 and cell 2. Cells 1 and 2 are in the active set, the maximum active set size being 2 in this example. Cell 3 is not, but also sends pilot signals that are received by the mobile user station.

At any time P1 is taken as the highest signal to noise ratio of the cells currently in the active set; and P2 is the lowest signal to noise ratio among the cells currently in the active set. If the signal to noise ratio P3 of pilot signals from cell 3 goes above current P2 level plus $OFFSET_{rep}$ (step g) for more than a predetermined minimum time interval, denoted $TMIN_{rep}$, then the mobile user station sends (step h) a report indicating cell 2 is evaluated as being suitable for replacement in the active set by another cell giving a sufficiently "better" signal to noise ratio. This report is sent periodically repeatedly (not shown) until either cell 2 is replaced by cell 3 in the active set and the mobile user station is informed accordingly, or, as time goes on, P3 changes relative to P2 so as to be no greater than P2 plus $OFFSET_{rep}$ no longer applies, whichever happens first.

It will be appreciated that the $OFFSET_{rep}$ parameter is of importance in deciding whether to replace a cell into the active set. The larger the value of this $OFFSET_{rep}$ parameter, the less likely it is for a cell to be replaced in the active set. Also, the larger the value set for $TMIN_{rep}$, the less likely it is that a cell will be replaced.

Example Values

Some example values for these handover criteria parameters for various data rates are shown in Tables 1 to 3 below.

For example, voice over Internet Protocol (VoIP), is a typical low data rate service, typically about 16 kbps. It is important that such a service is available almost everywhere within a network. A typical medium rate service of 64 kbps is email or low quality video streaming, where both capacity in terms of supporting a good number of users and coverage are important. For high speed data applications, such as File Transfer Protocol (FTP) file transfer and good quality video streaming, requiring e.g. 384 kbps, wide coverage is not important, as it is more useful to provide good capacity in relatively small "hotspot" areas of coverage. Downlink transmit power is significantly higher for 384 kbps service than for lower rates so as to ensure good reception accuracy.

Referring to Tables 1 to 3, it will be seen that handover parameter values are selected such that as the data rate increases it is made harder to add a cell into the active set (Table 1), easier to delete a cell from the active set (Table 2), and harder to replace a cell in the active set (Table 3). Also as the data rate increases, the active set size gets smaller (Tables 1 and 3). Thus with increasing data rate additional handover links and swapping of handover links are both discouraged. This provides improved cell capacity for a higher data rate service relative to a lower rate service but at the expense of coverage reliability by the service. In other words, there is lower coverage reliability for the higher rate service in consequence.

TABLE 1

Adding a cell into the active set

| Data Rate | $OFFSET_{add}$ | $TMIN_{add}$ | Active Set size |
|---|---|---|---|
| 16 kbps e.g. VoIP | 5 dB | 0 Seconds | 4 |
| 64 kbps e.g. email | 4 dB | 0.125 Seconds | 3 |
| 384 kpbs e.g. FTP, good quality video streaming | 3 dB | 0.25 Seconds | 2 |

TABLE 2

Deleting a cell from the active set

| Data Rate | $OFFSET_{del}$ | $TMIN_{del}$ |
|---|---|---|
| 16 kbps e.g. VoIP | 7 dB | 1 Second |
| 64 kbps e.g. email | 6 dB | 0.5 Second |
| 384 kpbs e.g. FTP, good quality video streaming | 5 dB | 0.25 Second |

TABLE 3

Replacing a cell in the active set

| Data Rate | $OFFSET_{rep}$ | $TMIN_{rep}$ | Active Set size |
|---|---|---|---|
| 16 kbps e.g. VoIP | 2 dB | 0.5 Seconds | 4 |
| 64 kbps e.g. email | 2 dB | 1 Second | 3 |
| 384 kpbs e.g. FTP, good quality video streaming | 3 dB | 1 Second | 2 |

Alternative Implementations

In an alternative but otherwise similar implementation, rather than, as shown in Table 3, varying $OFFSET_{rep}$ and $TMIN_{rep}$ as data rate varies, $OFFSET_{rep}$ is maintained at 2 dB and $TMIN_{rep}$ is maintained at 0.5 secs for all data rates. In consequence, in this alternative, a one for one replacement of a cell in the active set is not increasingly discouraged with increasing data rate. The idea behind this is to maintain good call quality by not discouraging the replacement of a weaker soft handover connection with a stronger one. Of course, the decrease in active set size with increasing data rate still occurs.

In another alternative implementation, rather than soft/softer handover being triggered by the mobile user station sending a message to the network that the signal quality criteria for a handover has been met, to which the network responds (MEHO), the network can receive a stream of signal quality measurements provided by the mobile user station which the network evaluates to determine if a criterion for handover is met.

General

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of establishing or releasing a radio connection between a first mobile user station and a first cell for wireless telecommunications during a call with the first mobile user station whilst the call continues and dependent upon at least one predetermined criterion being met, in a network for wireless telecommunications handling calls with various data rates to mobile user stations such that some of the mobile user stations at a time have multiple radio connections to the network via multiple cells, the method comprising:

sending a pilot signal between the first cell and the first mobile user station, detecting received signal quality of the pilot signal between the first cell and the first mobile user station, determining that said signal quality of the pilot signal meets said at least one predetermined criterion and so establishing or releasing said radio connection, and selecting at least one predetermined criterion, said at least one predetermined criterion being dependent upon data rate of the call, such that fewer multiple radio connections are made with the mobile user station when the data rate of the call is higher than when it is lower.

2. A method according to claim 1, in which said at least one predetermined criterion which is dependent upon the data rate of the call is a minimum difference in received signal quality between the pilot signal of the first cell and received signal quality of a pilot signal of another cell, that another cell being in radio connection with the first mobile user station with the highest received signal quality of all cells currently in radio connection with the first mobile user station.

3. A method according to claim 2, in which for establishing the radio connection, the criterion is that the received signal quality of the first cell is lower than the received signal quality of said another cell by less than a predetermined amount, the predetermined amount being selected dependent on the data rate of the call such that the predetermined amount is smaller at a higher data rate.

4. A method according to claim 2, in which for releasing the radio connection, one criterion is that the received signal quality of the first cell is lower than the received signal quality of said another cell by more than a predetermined amount, the predetermined amount being selected dependent on the data rate of the call such that the predetermined amount is smaller at a higher data rate.

5. A method according to claim 2, in which there is a further cell in radio connection with the first mobile user station, in respect of which received signal quality of a pilot signal is determined, received signal quality for the further cell being less than for said another cell, upon the received signal quality for said first cell going higher than the received signal quality of said further cell by more than a predetermined amount both releasing the radio connection to said further cell and establishing said radio connection to said first cell, the predetermined amount being selected dependent on the data rate of the call such that the predetermined amount is larger at a higher data rate.

6. A method according to claim 2, in which another criterion is the minimum time for which said one criterion must be satisfied in order to be acted upon, the minimum time being selected dependent upon data rate of the call.

7. A method according to claim 6, in which, for establishing the radio connection, the selected minimum time is longer at a higher data rate.

8. A method according to claim 6, in which, for releasing the radio connection, the selected minimum time is shorter at a higher data rate.

9. A method according to claim 2, in which another criterion is the maximum number of radio connections possible with the mobile user station at a time.

10. A method according to claim 9, in which said maximum number is selected to be smaller at a higher data rate.

11. A network for wireless telecommunications handling calls with various data rates to mobile user stations via cells such that some of the mobile user stations at a time have multiple radio connections to the network via multiple cells, comprising apparatus operative to establish or release a radio connection between a first mobile user station and a first cell during a call with the first mobile user station whilst the call continues and dependent upon at least one predetermined criterion being determined as being met, the apparatus comprising a transmitter operative to sending a pilot signal between the first mobile user station and first cell, a receiver operative to detect received signal quality of the pilot signal between the first cell and the first mobile user station, a selector operative to select said at least one predetermined criterion dependent upon data rate of the call, such that fewer multiple radio connections are made with the mobile user station when the data rate of the call is higher than when it is lower, and a signal quality determinator operative to determine whether said signal quality of the pilot signal meets said at least one predetermined criterion.

12. A mobile user station for wireless telecommunications comprising apparatus operative to establish or release a radio connection between the mobile user station and a first cell of a base station during a call with the mobile user station whilst the call continues and dependent upon at least one predetermined criterion being met, the mobile user station comprising a detector being operative to detect received signal quality of a pilot signal sent between the first cell and the mobile user station, a selector operative to select said at least one predetermined criterion dependent upon data rate of the call, such that fewer multiple radio connections are made with the mobile user station when the data rate of the call is higher than when it is lower, and a signal quality determinator operative to determine whether said signal quality of the pilot signal meets said at least one predetermined criterion.

* * * * *